US011260866B2

(12) United States Patent
Yu

(10) Patent No.: US 11,260,866 B2
(45) Date of Patent: Mar. 1, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Kaijiang Yu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/010,884

(22) Filed: Sep. 3, 2020

(65) Prior Publication Data

US 2021/0070302 A1 Mar. 11, 2021

(30) Foreign Application Priority Data

Sep. 9, 2019 (JP) .............................. JP2019-163787

(51) Int. Cl.
*B60W 30/18* (2012.01)
*B60W 30/095* (2012.01)
*B60W 30/14* (2006.01)
*B60W 30/16* (2020.01)
*B60Q 1/34* (2006.01)

(52) U.S. Cl.
CPC ....... *B60W 30/18163* (2013.01); *B60Q 1/346* (2013.01); *B60W 30/0956* (2013.01); *B60W 30/143* (2013.01); *B60W 30/16* (2013.01); *B60W 2554/80* (2020.02)

(58) Field of Classification Search
CPC .............................................. B60W 30/18163
See application file for complete search history.

(56) References Cited

U.S. PATENT DOCUMENTS

| | | | |
|---|---|---|---|
| 9,940,834 B1* | 4/2018 | Konrardy | G08G 1/161 |
| 10,106,163 B2* | 10/2018 | Fujiki | B60W 10/20 |
| 10,909,716 B2* | 2/2021 | Zhao | G05D 1/0234 |
| 11,077,845 B2* | 8/2021 | Shalev-Shwartz | B60W 50/082 |
| 11,145,197 B2* | 10/2021 | Guo | H04W 4/44 |
| 2004/0184879 A1* | 9/2004 | Winkler | E01C 1/04 404/1 |

(Continued)

FOREIGN PATENT DOCUMENTS

JP 2016-210380 12/2016
JP 2017-124743 7/2017

(Continued)

*Primary Examiner* — Alex C Dunn
(74) *Attorney, Agent, or Firm* — Amin, Turocy & Watson, LLP

(57) ABSTRACT

A vehicle control device includes an action controller that is configured to control an action of a vehicle, in which, in a case where there is another vehicle traveling on a second road adjacent to a first road on which the vehicle is traveling, and the vehicle is controlled to overtake another vehicle, the action controller is configured to accelerate the vehicle, causes the vehicle to show an intention to enter the second road when the vehicle is located a predetermined distance or more in front of another vehicle in an advancing direction of the vehicle after the vehicle is accelerated, and decelerates the vehicle while maintaining the vehicle in a state in which the vehicle is located in front of another vehicle at a timing according to the entry intention.

11 Claims, 12 Drawing Sheets

(56) References Cited

U.S. PATENT DOCUMENTS

| | | | |
|---|---|---|---|
| 2010/0161192 A1* | 6/2010 | Nara | G01C 21/26 701/70 |
| 2012/0068858 A1* | 3/2012 | Fredkin | G08G 1/166 340/902 |
| 2013/0322702 A1* | 12/2013 | Piemonte | G06F 16/2291 382/113 |
| 2014/0097969 A1* | 4/2014 | Ni | G08G 1/081 340/907 |
| 2014/0362195 A1* | 12/2014 | Ng-Thow-Hing | G06F 3/04815 348/51 |
| 2015/0194055 A1* | 7/2015 | Maass | G08G 1/096716 340/905 |
| 2017/0057496 A1* | 3/2017 | Toyoda | G05D 1/0289 |
| 2017/0203764 A1* | 7/2017 | Fujiki | B60W 10/20 |
| 2017/0259819 A1* | 9/2017 | Takeda | B60W 10/04 |
| 2017/0334451 A1* | 11/2017 | Asakura | B60W 10/20 |
| 2017/0369055 A1* | 12/2017 | Saigusa | G08G 1/0116 |
| 2018/0126990 A1* | 5/2018 | Shimada | B60W 30/09 |
| 2018/0253975 A1* | 9/2018 | Mizutani | B60W 30/16 |
| 2018/0281803 A1* | 10/2018 | Mukai | G08G 1/056 |
| 2018/0301036 A1* | 10/2018 | Villavicencio | B60Q 1/00 |
| 2018/0345988 A1* | 12/2018 | Mimura | G05D 1/0088 |
| 2018/0362031 A1* | 12/2018 | Chang | G07C 5/008 |
| 2019/0139415 A1* | 5/2019 | Sakaguchi | G08G 1/052 |
| 2019/0168732 A1* | 6/2019 | Tashiro | B60W 10/06 |
| 2019/0291728 A1* | 9/2019 | Shalev-Shwartz | B60W 30/165 |
| 2019/0329771 A1* | 10/2019 | Wray | G05B 13/04 |
| 2019/0333381 A1* | 10/2019 | Shalev-Shwartz | B60W 50/10 |
| 2019/0375412 A1* | 12/2019 | Ishioka | B60W 30/18163 |
| 2019/0389462 A1* | 12/2019 | Gesch | G06K 9/00805 |
| 2020/0130690 A1* | 4/2020 | Chow | B60W 30/09 |
| 2020/0143669 A1* | 5/2020 | Mulcahy | G06N 3/0454 |
| 2020/0192386 A1* | 6/2020 | Stenneth | G01C 21/3602 |
| 2020/0307589 A1* | 10/2020 | Li | B60W 30/16 |
| 2020/0401160 A1* | 12/2020 | Lacaze | G05D 1/0295 |
| 2021/0031758 A1* | 2/2021 | Urano | B60K 35/00 |
| 2021/0035447 A1* | 2/2021 | Urano | B60W 30/0956 |
| 2021/0041869 A1* | 2/2021 | Meyer | G05D 1/0287 |
| 2021/0046936 A1* | 2/2021 | Umeda | B60W 50/0097 |
| 2021/0221367 A1* | 7/2021 | Hiramatsu | B60W 30/09 |
| 2021/0261123 A1* | 8/2021 | Wray | G06K 9/00805 |

FOREIGN PATENT DOCUMENTS

| | | | | |
|---|---|---|---|---|
| JP | 2021024423 A | * | 2/2021 | G06K 9/00791 |
| JP | 2021026554 A | * | 2/2021 | G08G 1/16 |

\* cited by examiner

COMPARATIVE EXAMPLE

COMPARATIVE EXAMPLE

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-163787, filed Sep. 9, 2019, the content of which is incorporated herein by reference.

BACKGROUND

Field

The present invention relates to a vehicle control device, a vehicle control method, and a storage medium.

Description of Related Art

In the related art, there is an entry assistance device that assists a vehicle in entering a second lane from a first lane. The entry assistance device calculates a traveling distance B before a vehicle stops at a preset deceleration, acquires a distance A from the vehicle to a reference location in the first lane during a period between an acceleration starting point to a lane change starting point, and stops entry assistance under a condition that a value obtained by subtracting the traveling distance B from the distance A is smaller than a preset threshold value (Japanese Unexamined Patent Application, First Publication No. 2017-124743 and Japanese Unexamined Patent Application, First Publication No. 2016-210380).

SUMMARY

However, in the related art, a vehicle may not be caused to travel smoothly. The present invention has been made in consideration of the circumstances, and one object thereof is to provide a vehicle control device, a vehicle control method, and a storage medium enabling a vehicle to travel smoothly.

The vehicle control device, the vehicle control method, and the storage medium related to the invention employ the following configurations.

(1): According to an aspect of the present invention, there is provided a vehicle control device including an acquirer that is configured to acquire a recognition result that is recognized by a recognizer recognizing a periphery of a vehicle; and an action controller that is configured to control an action of the vehicle on the basis of the recognition result acquired by the acquirer, in which, in a case where there is another vehicle traveling on a second road adjacent to a first road on which the vehicle is traveling, and the vehicle is controlled to overtake another vehicle, the action controller is configured to accelerate the vehicle, cause the vehicle to show an intention to enter the second road when the vehicle is located a predetermined distance or more in front of another vehicle in an advancing direction of the vehicle after the vehicle is accelerated, and decelerate the vehicle while maintaining the vehicle in a state in which the vehicle is located in front of another vehicle at a timing according to the entry intention.

(2): In the aspect of the above (1), the action controller is configured to cause the vehicle to show the entry intention by flashing a direction indicator of the vehicle.

(3): In the aspect of the above (1) or (2), the action controller is configured to decelerate the vehicle while maintaining the vehicle in a state in which the vehicle is located in front of another vehicle at a timing at which the entry intention is shown or within a predetermined time from the timing at which the entry intention is shown.

(4): In the aspect of any one of the above (1) to (3), the action controller is configured to control the vehicle to overtake another vehicle in a case where predetermined conditions related to another vehicle, the vehicle, and a reference position when the vehicle enters the second road are satisfied.

(5): In the aspect of the above (4), the predetermined conditions include at least one of a relative speed of another vehicle to the vehicle being equal to or lower than a predetermined speed, another vehicle being present within a predetermined distance from the vehicle in the advancing direction of the vehicle, and the vehicle being located in front of another vehicle in the advancing direction of the vehicle before reaching the reference position in a case where the vehicle is accelerated at a predetermined acceleration.

(6): In the aspect of any one of the above (1) to (5), in a case where a plurality of other vehicles are traveling at predetermined intervals on the second road, the action controller is configured to control the vehicle not to overtake the plurality of other vehicles.

(7): In the aspect of any one of the above (1) to (6), in a case where the vehicle reaches a location a specific distance before a region where the vehicle can enter the second road from the first road, another vehicle is recognized after control for the vehicle entering the second road is started, and the vehicle is controlled to overtake another vehicle, the action controller is configured to execute specific control of accelerating the vehicle, causing the vehicle to show the intention to enter the second road after the vehicle is accelerated, and decelerating the vehicle while maintaining the vehicle in a state in which the vehicle is located in front of another vehicle at the timing according to the entry intention, and not execute the specific control in a case where the vehicle reaches the location a specific distance before the region, another vehicle is recognized when or before the control for the vehicle entering the second road is started, and the vehicle is controlled to overtake another vehicle.

(8): In the aspect of any one of the above (1) to (7), the action controller is configured to accelerate the vehicle at a first acceleration in a case where a status of the second road is recognizable at a location a first distance before a region where the vehicle can enter the second road from the first road, another vehicle is recognized, and the vehicle is controlled to overtake another vehicle, and the action controller is configured to accelerate the vehicle at a second acceleration higher than the first acceleration in a case where the status of the second road is recognizable at a location a distance shorter than the first distance, another vehicle is recognized, and the vehicle is controlled to overtake another vehicle.

(9): In the aspect of the above (8), in a case where the vehicle is accelerated at the first acceleration, the action controller is configured to cause the vehicle to show the intention to enter the second road, and decelerates the vehicle at a first deceleration while maintaining the vehicle in a state in which the vehicle is located in front of another vehicle at the timing according to the entry intention, and, in a case where the vehicle is accelerated at the second acceleration higher than the first acceleration, the action controller is configured to cause the vehicle to show the intention to enter the second road, and decelerates the vehicle at a second deceleration higher than the first deceleration while maintaining the vehicle in a state in which the vehicle is located in front of another vehicle at the timing according to the entry intention.

(10): According to another aspect of the present invention, there is provided a vehicle control method of causing a computer to acquire a recognition result that is recognized by a recognizer recognizing a periphery of a vehicle; control an action of the vehicle on the basis of the acquired recognition result; and, in a case where there is another vehicle traveling on a second road adjacent to a first road on which the vehicle is traveling, and the vehicle is controlled to overtake another vehicle, accelerate the vehicle, cause the vehicle to show an intention to enter the second road when the vehicle is located a predetermined distance or more in front of another vehicle in an advancing direction of the vehicle after the vehicle is accelerated, and decelerate the vehicle while maintaining the vehicle in a state in which the vehicle is located in front of another vehicle at a timing according to the entry intention.

(11): According to still another aspect of the present invention, there is provided a non-transitory computer readable storage medium storing a program causing a computer to acquire a recognition result that is recognized by a recognizer recognizing a periphery of a vehicle; control an action of the vehicle on the basis of the acquired recognition result; and, in a case where there is another vehicle traveling on a second road adjacent to a first road on which the vehicle is traveling, and the vehicle is controlled to overtake another vehicle, accelerate the vehicle, cause the vehicle to show an intention to enter the second road when the vehicle is located a predetermined distance or more in front of another vehicle in an advancing direction of the vehicle after the vehicle is accelerated, and decelerate the vehicle while maintaining the vehicle in a state in which the vehicle is located in front of another vehicle at a timing according to the entry intention.

According to (1) to (3), (6), (7), (10), and (11), the vehicle is enabled to travel more smoothly.

According to (4) or (5), the vehicle control device controls the vehicle to overtake another vehicle in a case where a predetermined condition is satisfied, and can thus suppress unnecessary control or forcible overtaking.

According to (8) or (9), control corresponding to a timing at which a status of the second road is recognizable is performed, and thus control suitable for an occupant can be realized.

DETAILED DESCRIPTION

Hereinafter, with reference to the drawings, a vehicle control device, a vehicle control method, and a storage medium according to embodiments of the present invention will be described. As used throughout this disclosure, the singular forms "a," "an," and "the" include plural reference unless the context clearly dictates otherwise.

First Embodiment

Overall Configuration

Figure 1:
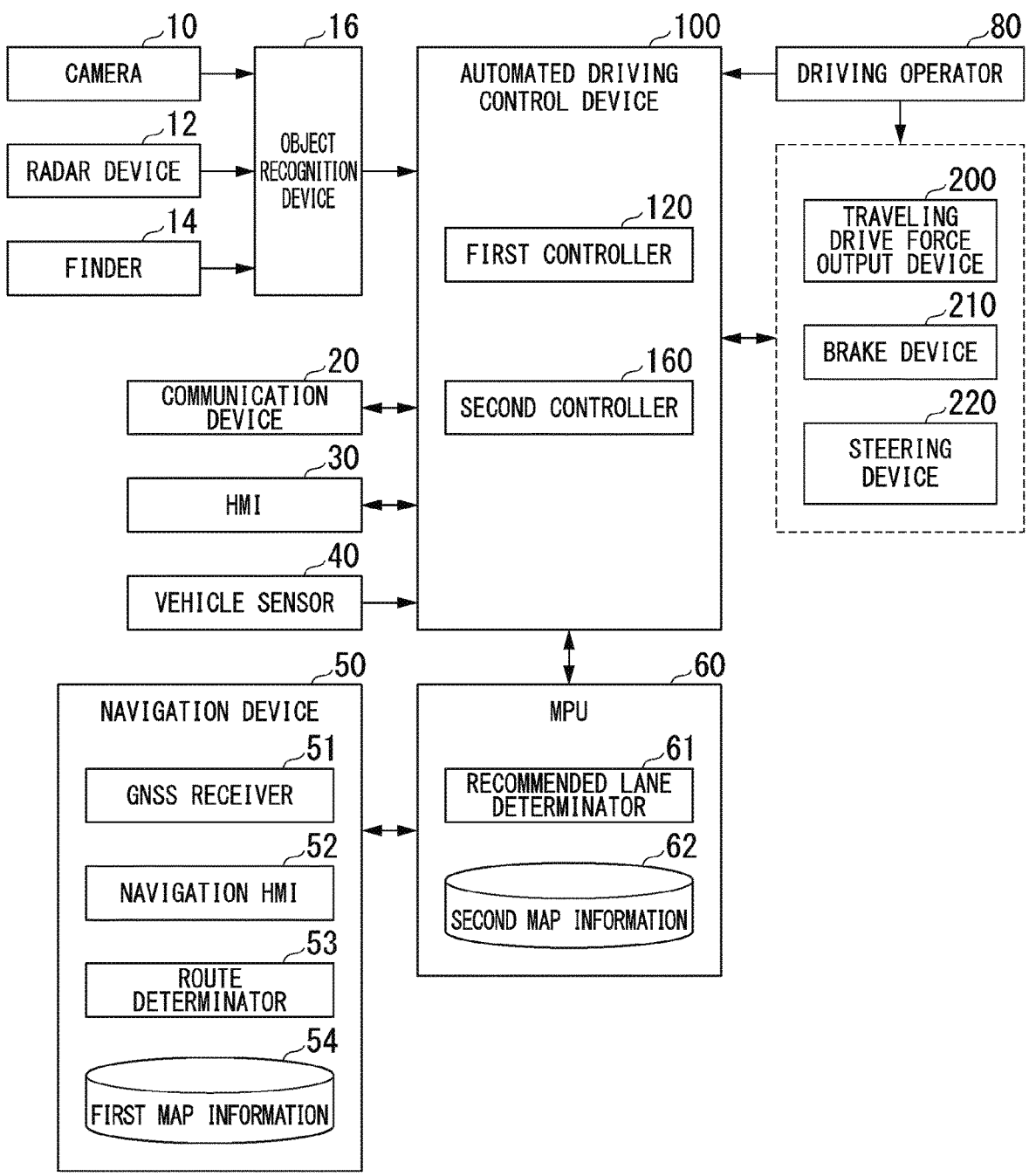
FIG. 1 is a diagram showing a configuration of a vehicle system using a vehicle control device related to an embodiment.

FIG. 1 is a diagram showing a configuration of a vehicle system 2 using a vehicle control device according to an embodiment. A vehicle having the vehicle system 2 mounted thereon is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle system 2 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. The devices and the apparatuses are connected to each other via a multiplex communication line such as a controller area network (CAN) communication line, a serial communication line, or a wireless communication network. The configuration shown in FIG. 1 is only an example, and some of the constituents may be omitted, and other constituents may be added.

The camera 10 is a digital camera using a solid-state imaging element such as a charge coupled device (CCD) or a complementary metal oxide semiconductor (CMOS). The camera 10 is attached at any location in a vehicle (hereinafter, an own vehicle M) on which the vehicle system 2 is mounted. In a case where the front side is imaged, the camera 10 is attached to the upper part of a front windshield, the back surface of an interior mirror, or the like. For example, the camera 10 periodically and repeatedly images the periphery of the own vehicle M. The camera 10 may be a stereo camera.

The radar device 12 radiates electric waves such as millimeter waves in the periphery of the own vehicle M, detects electric waves (reflected waves) reflected by an object, and thus detects at least a position (a distance and an azimuth) of the object. The radar device 12 is attached at any location in the own vehicle M. The radar device 12 may detect a position and a speed of an object according to a frequency modulated continuous wave (FM-CW) method.

The finder 14 is light detection and ranging (LIDAR). The finder 14 applies light in the periphery of the own vehicle M, and measures scattered light. The finder 14 detects a distance to a target on the basis of a time from light emission to light reception. The applied light is, for example, pulsed laser light. The finder 14 is attached at any location in the own vehicle M.

The object recognition device 16 performs a sensor fusion process on detection results from some or all of the camera 10, the radar device 12, and the finder 14, and thus recognizes a position, the type, a speed, and the like of an object. The object recognition device 16 outputs a recognition result to the automated driving control device 100. The object recognition device 16 may output detection results from the camera 10, the radar device 12, and the finder 14 to the automated driving control device 100 without change. The object recognition device 16 may be omitted from the vehicle system 2.

The communication device 20 performs communication with another vehicle present in the periphery of the own vehicle M, or performs communication with various server apparatus via a wireless base station by using, for example, a cellular network, a Wi-Fi network, Bluetooth (registered trademark), or Dedicated Short Range Communication (DSRC).

The HMI 30 presents various pieces of information to an occupant of the own vehicle M, and also receives an input operation from the occupant. The HMI 30 includes various display devices, a speaker, a buzzer, a touch panel, switches, keys, and the like.

The vehicle sensor 40 includes, for example, a vehicle speed sensor detecting a speed of the own vehicle M, an acceleration sensor detecting acceleration, a yaw rate sensor detecting an angular speed about a vertical axis, and an azimuth sensor detecting an orientation of the own vehicle M.

The navigation device 50 includes, for example, a global navigation satellite system (GNSS) receiver 51, a navigation HMI 52, and a route determinator 53. The navigation device 50 stores first map information 54 in a storage device such as a hard disk drive (HDD) or a flash memory. The GNSS receiver 51 identifies a position of the own vehicle M on the basis of a signal received from a GNSS satellite. A position of the own vehicle M may be identified or complemented by an inertial navigation system (INS) using an output from the vehicle sensor 40. The navigation HMI 52 includes a display device, a speaker, a touch panel, keys, and the like. The navigation HMI 52 may be partially or entirely integrated into the HMI 30 described above. The route determinator 53 determines, for example, a route (hereinafter, a route on a map) from a position of the own vehicle M identified by the GNSS receiver 51 (or any entered position) to a destination that is entered by an occupant by using the navigation HMI 52 on the basis of the first map information 54. The first map information 54 is, for example, information in which a road shape is expressed by a link indicating a road and nodes connected to each other via the link. The first map information 54 may include a curvature of a road, point of interest (POI) information, and the like. The route on the map is output the MPU 60. The navigation device 50 may perform route guidance using the navigation HMI 52 on the basis of the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20, and may acquire a route equivalent to the route on the map from the navigation server.

The MPU 60 includes, for example, a recommended lane determinator 61, and stores second map information 62 in a storage device such as an HDD or a flash memory. The recommended lane determinator 61 divides the route on the map provided from the navigation device 50 into a plurality of blocks (for example, divides the route on the map every 100 m in a vehicle advancing direction), and determines a recommended lane for each block by referring to the second map information 62. The recommended lane determinator 61 determines in which lane from the left the own vehicle will travel. In a case where there is a branch location on the route on the map, the recommended lane determinator 61 determines a recommended lane such that the own vehicle M can travel on a reasonable route to advance to a branch destination.

The second map information 62 is map information with higher accuracy than that of the first map information 54. The second map information 62 includes, for example, lane center information or lane boundary information. The second map information 62 may include road information, traffic regulation information, address information (address/postal code), facility information, telephone number information, and the like. The second map information 62 may be updated at any time by the communication device 20 performing communication with other devices.

The driving operator 80 includes, for example, an accelerator pedal, a brake pedal, a shift lever, a steering wheel, an odd-shaped steering wheel, a joystick, and other operators. The driving operator 80 is attached with a sensor detecting an operation amount or whether or not an operation is performed, and a detection result is output to the automated driving control device 100 or some or all of the traveling drive force output device 200, the brake device 210, and the steering device 220.

The automated driving control device 100 includes, for example, a first controller 120 and a second controller 160. Each of the first controller 120 and the second controller 160 is realized, for example, by a hardware processor such as a central processing unit (CPU) executing a program (software). Some or all of the constituents may be realized by hardware (a circuit portion; including a circuitry) such as a large scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) such as an HDD or a flash memory of the automated driving control device 100, and may be stored in an attachable and detachable storage medium (non-transitory storage medium) such as a DVD or a CD-ROM and may be installed in the HDD or the flash memory of the automated driving control device 100 when the storage medium is attached to a drive device. The automated driving control device 100 is an example of a "vehicle control device", and a combination of an action plan generator 140 and the second controller 160 is an example of an "action controller".

Figure 2:
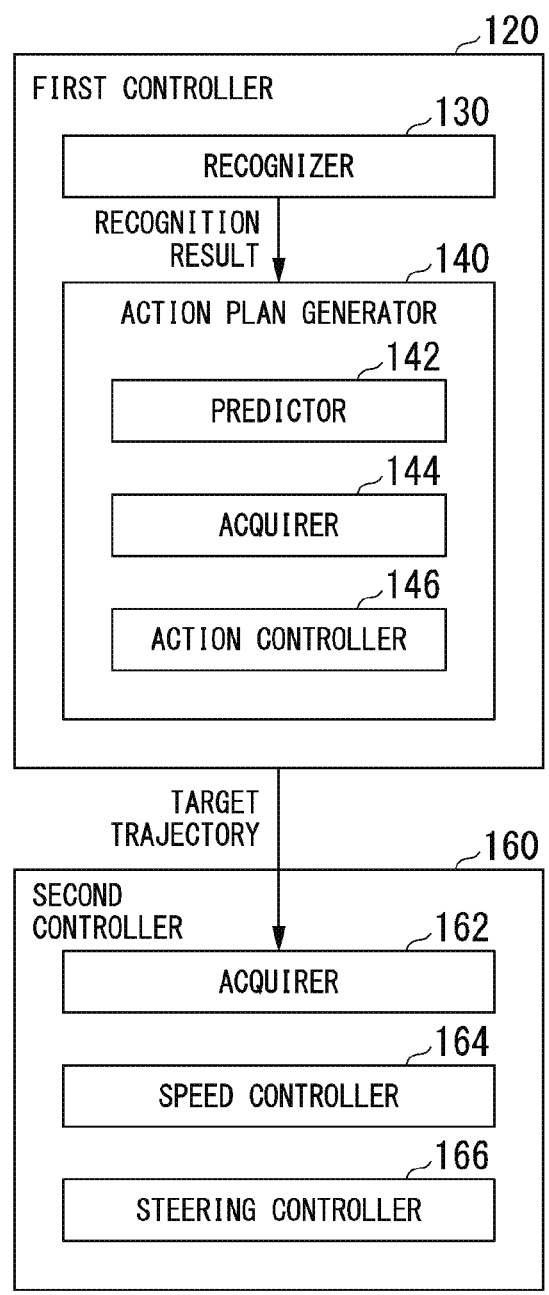
FIG. 2 is a diagram showing functional configurations of a first controller and a second controller.

FIG. 2 is a diagram showing a functional configuration of the first controller 120 and the second controller 160. The first controller 120 includes, for example, a recognizer 130 and an action plan generator 140. The first controller 120 is realized by combining, for example, a function of artificial intelligence (AI) with a function of a model provided in advance. For example, a function of "recognizing an intersection" may be realized by executing recognition of the intersection using deep learning and recognition based on conditions (for example, there are a signal that can be matched with a pattern, and a road marking) given in advance in parallel, and scoring and comprehensively evaluating both of recognition results. Consequently, the reliability of automated driving is ensured.

The recognizer 130 recognizes states of an object, such as a position, a speed, and an acceleration in the vicinity of the own vehicle M on the basis of information that is input from the camera 10, the radar device 12, and the finder 14 via the object recognition device 16. The position of the object is recognized as, for example, a position in an absolute coordinate system having a representative point (for example, the centroid or the drive axis center) of the own vehicle M as an origin, and is used for control. The position of the object may be represented by a representative point such as the centroid or a corner of the object, and may be represented by an expressed region.

The "states" of the object may include an acceleration, a jerk, or an "action state" of the object (for example, the object is trying to change lanes or whether or not the object is trying to change lanes).

The action plan generator 140 generates one or more target trajectories on which the own vehicle M automatedly (regardless of an operation of a driver) travels in the future such that the own vehicle can travel in a recommended lane determined by the recommended lane determinator 61 in principle and can cope with a peripheral situation of the own vehicle M. The target trajectory includes, for example, a speed element. For example, the target trajectory is expressed by sequentially arranging locations (trajectory points) to be reached by the own vehicle M. The trajectory points are locations to be reached by the own vehicle M every predetermined traveling distance (for example, about several [m]) in terms of a distance along a road, and, separately therefrom, a target speed and a target acceleration for each predetermined sampling time (for example, any of about 0.1 to 0.9 seconds) are generated as parts of the target trajectory. A trajectory point may be a position to be reached by the own vehicle M at a sampling time point every predetermined sampling time. In this case, information regarding the target speed or the target acceleration may be expressed by an interval between trajectory points.

The action plan generator 140 may set an automated driving event when generating the target trajectory. The automated driving event includes, for example, a constant speed traveling event, a low speed following traveling event, a lane change event, a branch event, a merging event, and a takeover event. The action plan generator 140 generates a target trajectory corresponding to a started event. For example, when the target trajectory is generated, the action plan generator 140 generates the target trajectory in consideration of a processing result from an action controller 146 which will be described later.

The action plan generator 140 includes, for example, a predictor 142, an acquirer 144, and the action controller 146. The predictor 142 predicts a future position of another vehicle present in the periphery of the own vehicle M on the basis of a recognition result from the recognizer 130. For example, the predictor 142 predicts a direction in which another vehicle will travel or a position where another vehicle will be present a predetermined time later on the basis of a behavior (a vehicle speed or an acceleration) or the past action history of another vehicle. The acquirer 144 acquires the current position of another vehicle recognized by the recognizer 130 and the future position of another vehicle predicted by the predictor 142.

The action controller 146 controls an action of the vehicle on the basis of the information acquired by the acquirer 144. Details of a process in the action controller 146 will be described later.

The second controller 160 controls the traveling drive force output device 200, the brake device 210, and the steering device 220 such that the own vehicle M can pass along the target trajectory generated by the action plan generator 140 as scheduled.

Referring to FIG. 2 again, the second controller 160 includes, for example, an acquirer 162, a speed controller 164, and a steering controller 166. The acquirer 162 acquires information regarding the target trajectory (trajectory point) generated by the action plan generator 140, and stores the information in a memory (not shown). The speed controller 164 controls the traveling drive force output device 200 or the brake device 210 on the basis of a speed element included in the target trajectory stored in the memory. The steering controller 166 controls the steering device 220 according to a curved state of the target trajectory stored in the memory. Processes in the speed controller 164 and the steering controller 166 are realized by a combination of, for example, feedforward control and feedback control. As an example, the steering controller 166 executes a combination of feedforward control based on a curvature of a road in front of the own vehicle M and feedback control based on deviation from the target trajectory.

The traveling drive force output device 200 outputs traveling drive force (torque) for traveling of the vehicle to drive wheels. The traveling drive force output device 200 includes, for example, a combination of an internal combustion engine, a motor, and a transmission, and an electronic control unit (ECU) controlling the constituents. The ECU controls the constituents according to information that is input from the second controller 160 or information that is input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information being input from the second controller 160 or information being input from the driving operator 80, so that brake torque corresponding to a braking operation is output to each vehicle wheel. The brake device 210 may include a mechanism, as a backup, transmitting hydraulic pressure generated by operating the brake pedal included in the driving operator 80, to the cylinder via a master cylinder. The brake device 210 may be an electronic control type hydraulic brake device that controls an actuator according to information being input from the second controller 160 and thus transmits hydraulic pressure in a master cylinder to the cylinder.

The steering device 220 includes, for example, a steering ECU and an electric motor. The electric motor changes an orientation of a turning wheel by applying force to, for example, a rack-and-pinion mechanism. The steering ECU drives the electric motor on the basis of information being input from the second controller 160 or information being input from the driving operator 80, so that an orientation of the turning wheel is changed.

Outline of Specific Control

In a case where there is another vehicle traveling on a second road adjacent to a first road on which the vehicle M is traveling, and the vehicle is controlled to overtake another vehicle, the action controller 146 accelerates the vehicle M, causes the vehicle M to show an intention to enter the second road when the vehicle M is located a predetermined distance or more in front of another vehicle in an advancing direction of the vehicle M, and decelerates the vehicle M in a state in which the vehicle M is located in front of another vehicle at a timing based on the entry intention. Hereinafter, this control will be referred to as "specific control" in some cases.

The phrase "show an intention to enter the second road when the vehicle M is located a predetermined distance or more in front of another vehicle" indicates showing an entry intention of the vehicle by flashing a direction indicator of the vehicle. The "timing based on the entry intention" is a timing at which the entry intention is shown (a timing at which the direction indicator is lit or flashed), or may be a timing within a predetermined time from the timing. The timing within the predetermined time may be a timing before or after the timing at which the entry intention is shown.

Specific Example 1 of Specific Control

Figure 3:
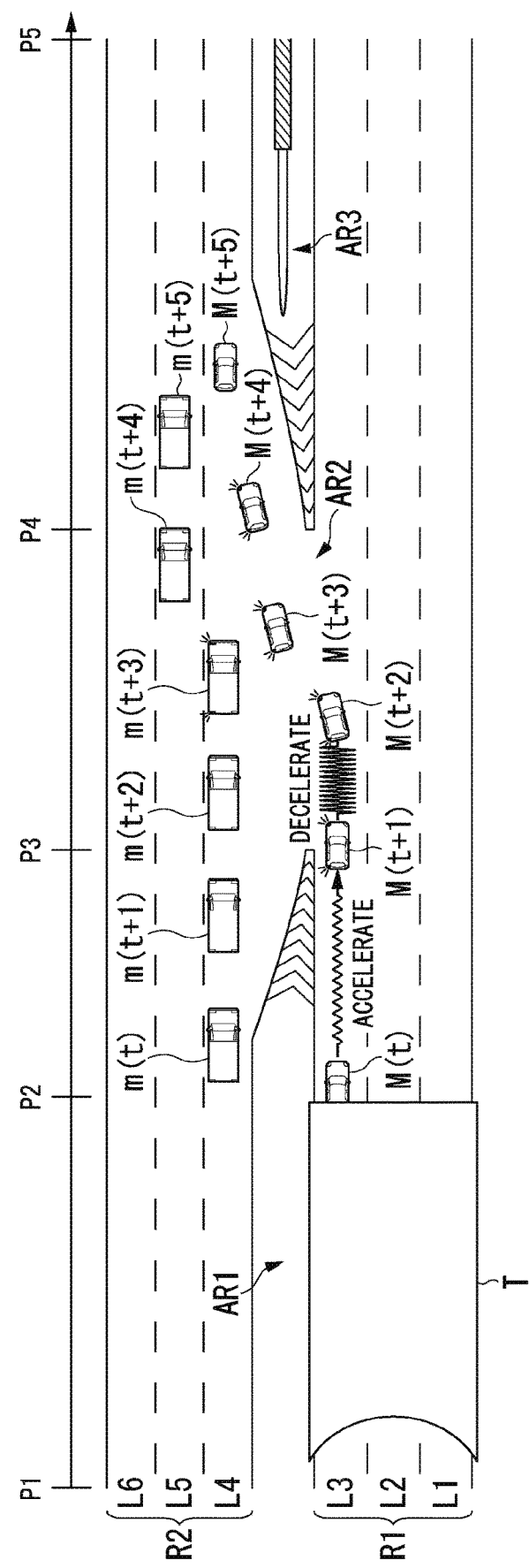
FIG. 3 is a diagram showing specific control.

FIG. 3 is a diagram (first) showing specific control. Vehicles traveling on a first road R1 and a second road R2 are advancing in the same direction. The vehicles are traveling from a position P1 toward a position P5 in FIG. 3. FIG. 3 shows a road environment in which the first road R1 merges with the second road R2. A division region AR1, a merging region AR2, and a division region AR3 are provided between the first road R1 and the second road R2. The division region AR1 is a region between the position P1 and the position P3. The merging region AR2 is a region between the position P3 and the position P4. The division region AR3 is a region between the position P4 and the position P5. The merging region AR2 is a region in which a vehicle traveling on the first road R1 can enter the second road R2 or a vehicle traveling on the second road R2 can enter the first road R1.

The first road R1 includes, for example, a lane L1, a lane L2, and a lane L3. The second road R2 includes, for example, a lane L4, a lane L5, and a lane L6. For example, a vehicle can enter the second road R2 from the first road R1 by changing a lane from the lane L3 to the lane L4 in the merging region AR2. A tunnel T is provided between the position P1 and the position P2 in the first road R1.

For example, it is assumed that the vehicle M enters the second road R2 from the first road R1. After the vehicle M comes out of the tunnel T, at time point t (at the position P2), the vehicle M recognizes that another vehicle m is traveling on the second road R2 in the advancing direction. In this case, the action controller 146 controls the vehicle M to overtake another vehicle m in a case where predetermined conditions related to another vehicle m, the vehicle M, and a reference position when the vehicle M is entering the second road R2 are satisfied. For example, the vehicle M is accelerated. For example, the action controller 146 determines another vehicle m satisfying the predetermined conditions as a target vehicle, and causes the vehicle M to enter the second road R2 by overtaking the target vehicle. The reference position is, for example, a position related to the advancing direction of the vehicle M, and is the position P4 or a position with respect to the position P4 (a position corresponding to several meters or several tens of meters before the position P4) in FIG. 3.

The "predetermined conditions" include at least one of the following (a) to (d).

(a) Another vehicle m is present before the reference position (several meters or several tens of meters before the reference position), and a relative speed of another vehicle m to the vehicle M is equal to or lower than a predetermined speed. In other words, another vehicle m is present before the reference position, and another vehicle m is traveling at a vehicle speed that is lower than a vehicle speed of the vehicle M by a predetermined speed or less.

(b) Another vehicle m is present before the reference position, and another vehicle m is present within a predetermined distance from the vehicle M in the advancing direction of the vehicle M.

(c) Another vehicle m is present before the reference position, and the vehicle M can be located in front of another vehicle m in the advancing direction of the vehicle M before reaching the reference position (or a predetermined distance before the reference position) in a case where the vehicle M is accelerated at a predetermined acceleration.

(d) Another vehicle m is present before the reference position, and the vehicle M can remain in front of another vehicle m in a case where the vehicle M is decelerated at a predetermined deceleration after being accelerated at a predetermined acceleration.

In a case where a plurality of other vehicles are traveling on the second road R2 at predetermined intervals, the action controller 146 may control the vehicle M not to overtake another vehicle m. For example, in a case where other vehicles m are present at a predetermined density on the second road R2, when it is not possible to expect to reach a destination more quickly by a predetermined degree or higher than in a case of not overtaking another vehicle m even if the vehicle M overtakes another vehicle m that is a target vehicle, the action controller 146 does not execute the specific control.

At time point t+1 (at the position P3), in a case where the vehicle M is located a predetermined distance in front of another vehicle m, the vehicle M shows a first entry intention and a second entry intention in a state in which the vehicle M is located in front of another vehicle m. After time point t+1, the vehicle M is maintained in a state in which the vehicle M is located in front of another vehicle m. The second entry intention may be shown within a predetermined time after the first entry intention is shown, and the first entry intention may be shown within a predetermined time after the second entry intention is shown. The first entry intention and the second entry intention may be shown substantially simultaneously.

The first entry intention is flashing of the direction indicator indicating entry into the second road R2. The second entry intention is one or both of showing an intention to enter the second road R2 by reducing a speed or suppressing acceleration and a behavior of coming close to the second road R2 side.

At time point t+2, the vehicle M starts to move to a position in front of another vehicle m on the second road R2, and, at time points t+3 and t+4, the vehicle M keeps moving and enters the second road R2 from the first road R1. At time point t+5, the vehicle M enters the second road R2, and then travels in front of another vehicle m in the advancing direction.

For example, as described above, the vehicle M performs acceleration, and shows the first entry intention and the second entry intention. Thus, the vehicle M can actively convey that the vehicle M will enter the second road R2 to another vehicle m (or an occupant of another vehicle m). Consequently, as illustrated in FIG. 3, for example, at time point t+3, another vehicle m may start to move to the adjacent lane L5 to give way to the vehicle M. Another vehicle m may perform a behavior of giving way to the vehicle M by reducing a speed or suppressing acceleration even though another vehicle m will not change a lane. As a result, the vehicle M can more smoothly enter the second road R2 from the first road R1.

For example, at the position P1 or the like before the position P2, in a case where the vehicle M can recognize positions or a distribution of other vehicles m traveling on the second road R2, the vehicle M increases a speed or maintains the speed before the position P2 in consideration of a status (other vehicles) of the second road R2 so as to be able to smoothly or rapidly enter the second road R2, and can thus enter the second road R2.

Figure 4:
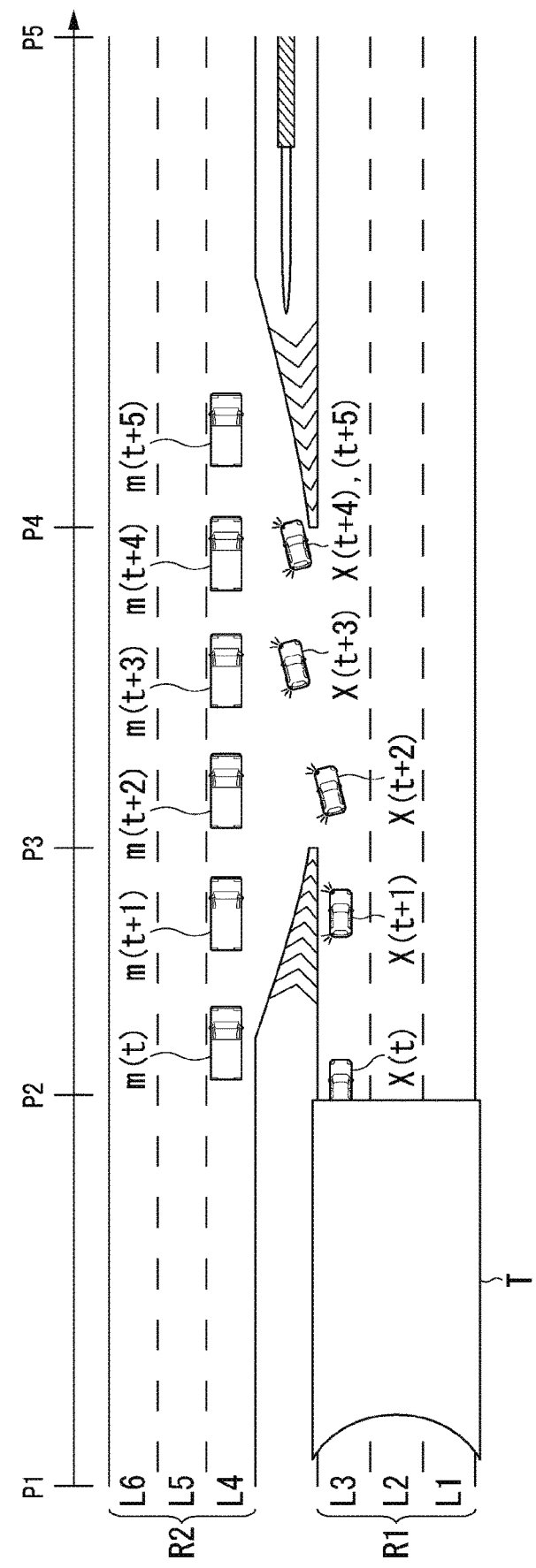
FIG. 4 is a diagram showing control for a vehicle X in Comparative Example 1.
Figure 5:
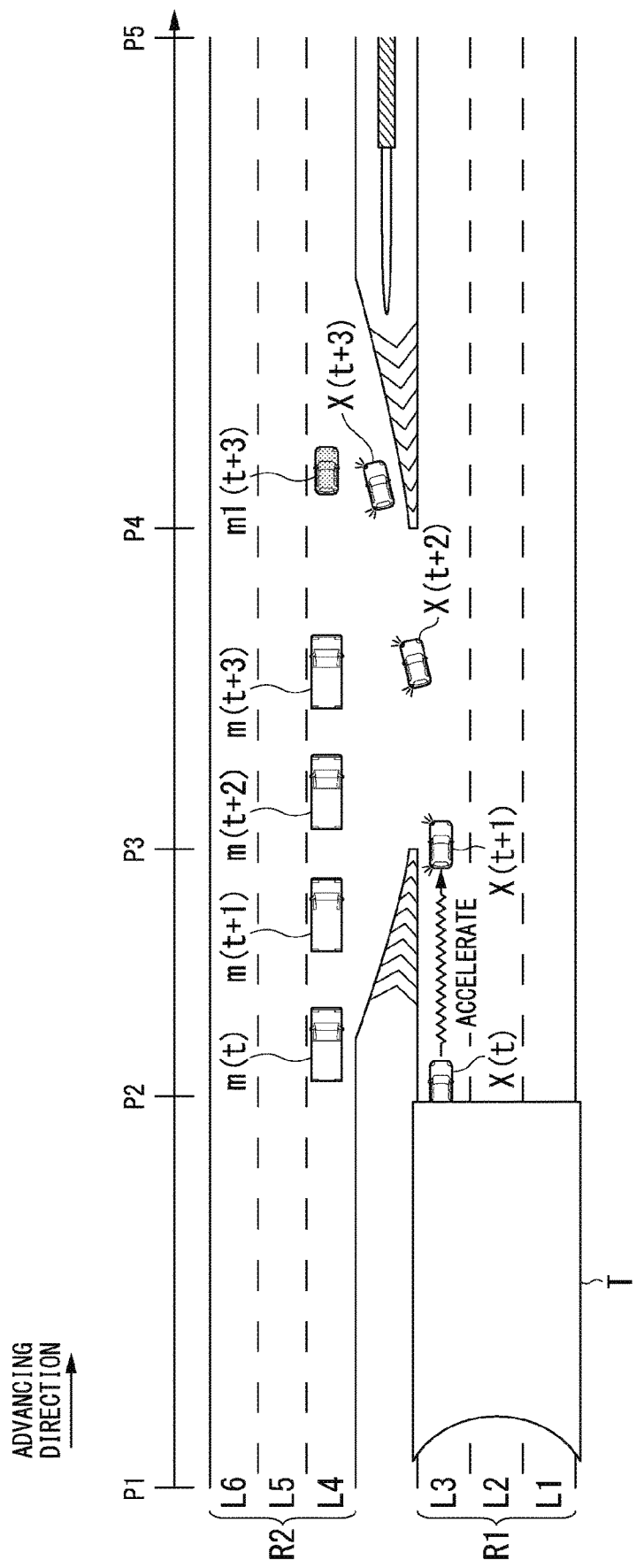
FIG. 5 is a diagram showing control for the vehicle X in Comparative Example 2.

However, in a comparative example, in a case where the vehicle M cannot recognize another vehicle m traveling on the second road R2 before the position P2 unlike in the above description and can recognize another vehicle m at the position P2, the vehicle M may not be able to smoothly or rapidly enter the second road R2 from the time point. For example, in this case, the vehicle M may be decelerated and travel to be located behind another vehicle m, so that the vehicle M may not rapidly or smoothly enter the second road R2. Even in a case where the vehicle M is not decelerated, as shown in FIGS. 4 and 5 which will be described later, the vehicle M may not be able to rapidly or smoothly enter the second road R2. Hereinafter, with reference to FIGS. 4 and 5, control executed by a vehicle X in a comparative example will be described.

Comparative Example 1

FIG. 4 is a diagram showing control for the vehicle X in Comparative Example 1. The same description as in FIG. 3 will not be repeated. Comparative Example 1 is an example in which the vehicle X is not accelerated and is not located in front of another vehicle m. For example, at time point t, in a case where the vehicle X is not accelerated and is not located in front of another vehicle m (for example, the vehicle X is traveling in parallel to another vehicle m), it is predicted that another vehicle m is unlikely to give way to the vehicle X even though the vehicle X flashes the direction indicator. In this case, the vehicle X cannot enter the second road R2 even at a reference position (for example, the position P4), and thus the vehicle X may stop near the reference position or may reduce a speed before reaching the reference position.

Comparative Example 2

FIG. 5 is a diagram showing control for the vehicle X in Comparative Example 2. The same description as in FIG. 3 will not be repeated. Comparative Example 2 is an example in which the vehicle X is accelerated and is located in front of another vehicle m, but is not decelerated. For example, it is assumed that the vehicle X is accelerated at time point t and the vehicle X is located in front of another vehicle m at time point t+1. In this case, when the vehicle X is not decelerated at time point t+1, and the vehicle X moves to enter the second road R2 at time points t+2 and t+3, a lateral gravitational acceleration may be applied to an occupant of the vehicle X such that comfort of the occupant may be impaired or the occupant may feel uneasy.

As shown in FIG. 5, in a case where still another vehicle m1 is present in front of another vehicle m in a lateral direction of the vehicle X on the second road R2, the vehicle X may perform a lane change to be located between another vehicle m and still another vehicle m1 by reducing a speed in the process of the lane change behavior (while moving in the lateral direction). As mentioned above, even when the vehicle X is not decelerated at time point t+1, the vehicle X may not be able to perform a smooth lane change, or may perform a lane change not suitable for an occupant.

In contrast, in a case where there is another vehicle m traveling on the second road R2 adjacent to the first road R1 on which the vehicle M is traveling, and the vehicle M is controlled to overtake another vehicle m, the action controller 146 of the present embodiment (1) accelerates the vehicle M, (2) causes the vehicle M to show an intention to enter the second road R2 when the vehicle is located a predetermined distance or more in front of another vehicle m in an advancing direction of the vehicle M, and (3) decelerates the vehicle M while maintaining the vehicle M in a state in which the vehicle M is located in front of another vehicle m at a timing based on the entry intention. Even after the vehicle M is decelerated, the vehicle M is maintained in a state in which the vehicle M is located in front of another vehicle m. Consequently, the vehicle M is enabled to smoothly or rapidly enter the second road R2.

An order of executing the above (1), (2), and (3) may be freely selected as long as the above (3) is executed after the above (1). For example, the above (2), (1), and (3), the above (1), (2), and (3), and the above (1), (3), and (2) may be executed in this order.

Flowchart

Figure 6:
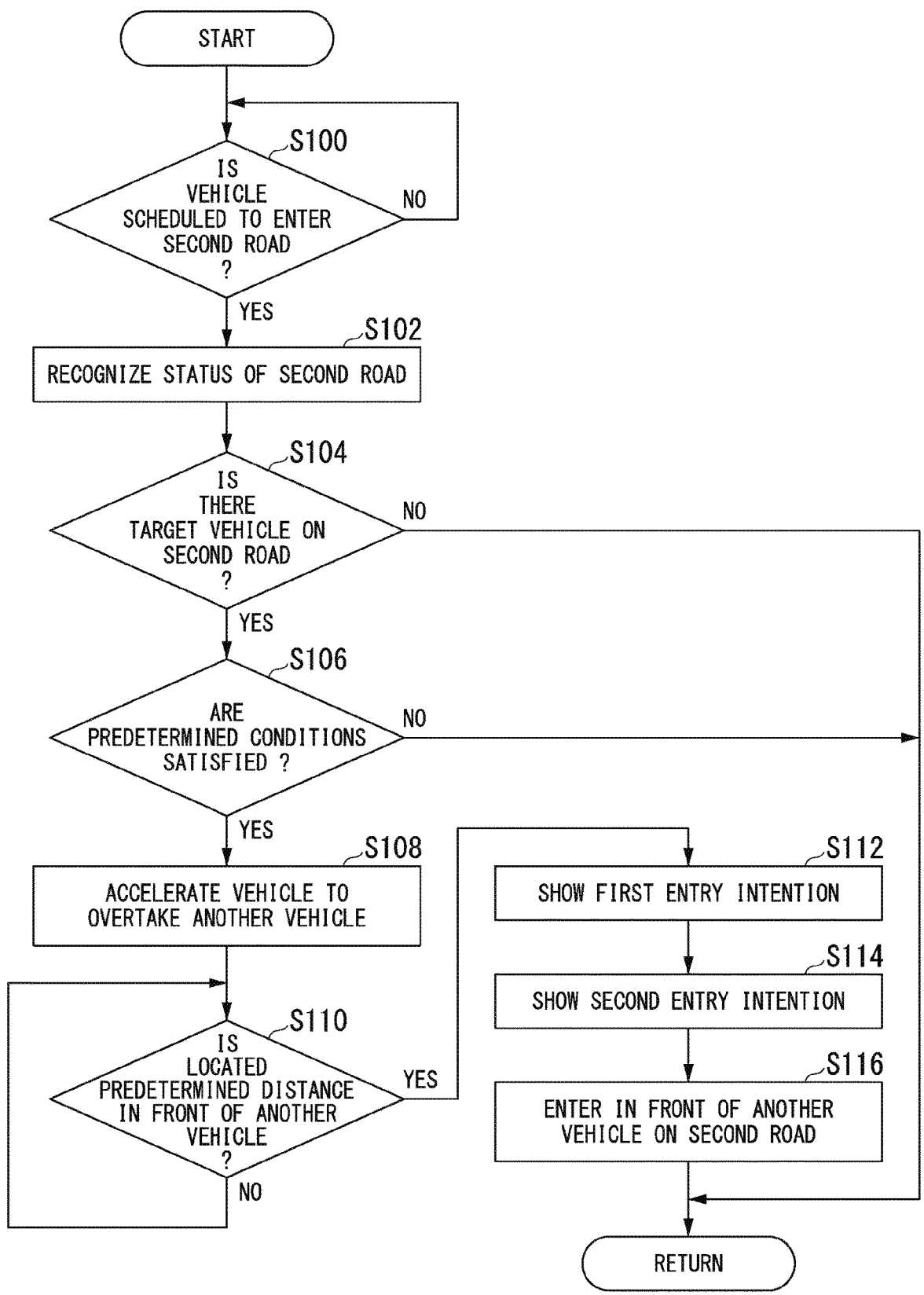
FIG. 6 is a flowchart (first) showing an example of a flow of a process executed by an automated driving control device.

FIG. 6 is a flowchart (first) showing an example of a flow of a process executed by the automated driving control device 100. First, the action controller 146 determines whether or not the vehicle M is scheduled to enter the second road R2 within a set distance (step S100). In a case where the vehicle M is scheduled to enter the second road R2 within the set distance, the recognizer 130 recognizes a status of the second road (step S102). Next, the action controller 146 determines whether or not there is a target vehicle (another vehicle m) on the second road R2 on the basis of the recognition result from the recognizer 130 (step S104).

In a case where there is a target vehicle (another vehicle m) on the second road R2, the action controller 146 determines whether or not the above-described predetermined conditions are satisfied (step S106). In a case where the predetermined conditions are satisfied, the action controller 146 accelerates the vehicle M to overtake another vehicle m that is a target vehicle (step S108). The action controller 146 determines whether or not the vehicle M is located a predetermined distance in front of another vehicle m (step S110). In a case where the vehicle M is not able to be located a predetermined distance in front of another vehicle m within a predetermined time, the process in the flowchart may be finished.

In a case where the vehicle M is located a predetermined distance in front of another vehicle m, the action controller 146 maintains the vehicle M in a state in which the vehicle M is located in front of another vehicle m in an advancing direction, causes the vehicle M to show the first entry intention (step S112), and causes the vehicle M to show the second entry intention (step S114). Next, the action controller 146 causes the vehicle M to enter in front of another vehicle m on the second road R2 (step S116). In a case where there is no target vehicle on the second road R2 in step S104 or the predetermined conditions are not satisfied in step S106, the process corresponding to one routine in the flowchart is finished.

As described above, the action controller 146 enables a vehicle to travel more smoothly by executing the specific control.

The action controller 146 may execute the specific control, for example, in a case where the vehicle M reaches a location (for example, a position between the position P1 and the position P2) a specific distance before a region where the vehicle M can enter the second road R2 from the first road R1, another vehicle m is recognized after control for the vehicle M entering the second road R2 is started at the reached location, and the vehicle M is controlled to overtake another vehicle m, and may not execute the specific control in a case where another vehicle m is recognized when control for the vehicle M entering the second road R2 is started (or before the control is started), and the vehicle M is controlled to overtake another vehicle m.

Figure 7:
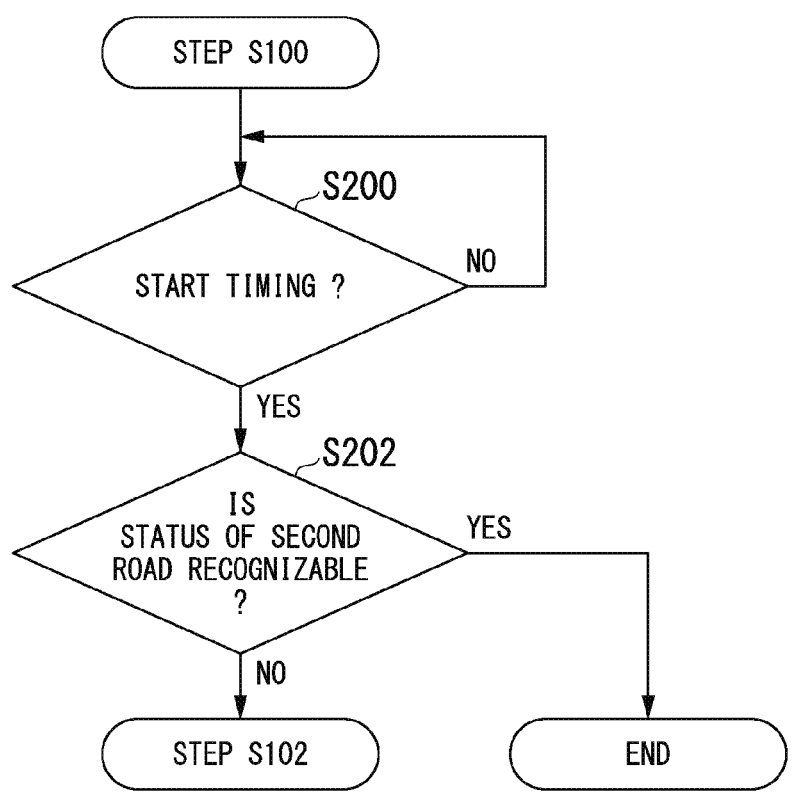
FIG. 7 is a flowchart (second) showing an example of a flow of a process executed by the automated driving control device.

In this case, for example, a process in a flowchart of FIG. 7 is executed between step S100 and step S102 in FIG. 6. FIG. 7 is a flowchart (second) showing an example of a flow of a process executed by the automated driving control device 100. In a case where the vehicle M is scheduled to enter the second road R2 within the predetermined distance, the action controller 146 determines whether or not a timing at which control for the vehicle M entering the second road R2 is started has arrived (step S200).

The vehicle M starting the control for the vehicle M entering the second road R2 indicates starting control for recognizing a status of another vehicle m on the second road R2 in order for the vehicle M to perform a lane change, or starting a process of determining a vehicle in front of or behind which the vehicle M is to be located when the vehicle M enters the second road R2 on the basis of a recognition result. For example, a timing at which the vehicle M reaches a location between the position P1 and the position P2 is an example of "when or before control for the vehicle M entering the second road R2 is started".

In a case where a timing at which the control for the vehicle M entering the second road R2 is started has arrived, the action controller 146 determines whether or not a status of the second road is recognizable (step S202). In a case where a status of the second road is recognizable, the process in the flowchart is finished. In other words, the specific control is not executed. For example, in a case where the specific control is not executed, the vehicle M moves to enter a location in front of or behind another vehicle traveling on the second road R2 on the basis of a status of the second road R2. Hereinafter, this control will be referred to as "first control" in some cases. In a case where a status of the second road is not recognizable, the flow proceeds to a process in step S102.

As mentioned above, in a case where a timing at which a status of the second road is recognizable is later than a timing at which control for the vehicle M entering the second road R2 is started (by a predetermined time), the action controller 146 executes the specific control. Consequently, even in a case where the time required to enter the second road R2 is relatively short, the specific control is executed, and thus the vehicle M can rapidly or smoothly enter the second road R2.

According to the above-described first embodiment, In a case where there is another vehicle m traveling on the second road adjacent to the first road on which the vehicle M is traveling, and the vehicle is controlled to overtake another vehicle m, the automated driving control device 100 accelerates the vehicle M, causes the vehicle M to show an intention to enter the second road when the vehicle M is located a predetermined distance or more in front of another vehicle m in an advancing direction of the vehicle M, decelerates the vehicle M in a state in which the vehicle M is located in front of another vehicle m at a timing based on the entry intention, and thus enables the vehicle to travel more smoothly.

Second Embodiment

Hereinafter, a second embodiment will be described. In the second embodiment, the action controller 146 determines whether or not the specific control is to be executed on the basis of a position where a status of the second road R2 is recognizable. Hereinafter, the second embodiment will be described focusing on differences from the first embodiment.

Figure 8:
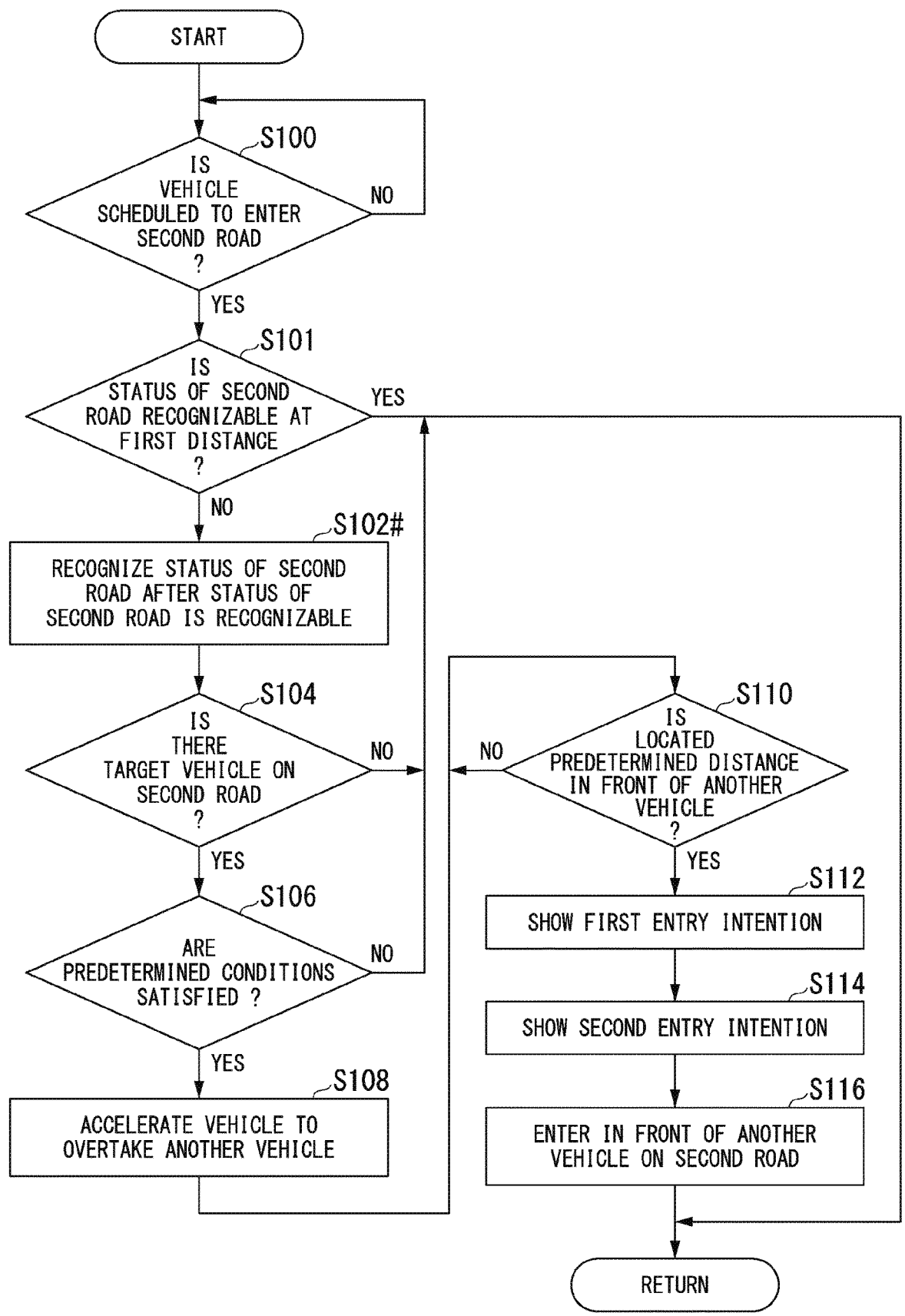
FIG. 8 is a flowchart showing an example of a flow of a process executed by an automated driving control device of a second embodiment.

FIG. 8 is a flowchart showing an example of a flow of a process executed by the automated driving control device 100 of the second embodiment. The description will focus on a process in step S101 that is a difference from the process in the flowchart of FIG. 6.

In a case where the vehicle M is scheduled to enter the second road R2, the action controller 146 determines whether or not a status of the second road R2 is recognizable at a first distance from the merging region AR2 (step S101).

In a case where a status of the second road R2 is not recognizable at the first distance from the merging region AR2, the flow proceeds to a process in step S102#. In step S102#, the recognizer 130 recognizes the status of the second road after the status of the second road R2 is recognizable (step S102#), and the flow proceeds to the process in step S104. In a case where the status of the second road R2 is recognizable at the first distance from the merging region AR2, the process corresponding to one routine in the flowchart is finished. In a case where the status of the second road R2 is recognizable at the first distance from the merging region AR2, for example, the first control is executed.

The position at the first distance (a position P1.5 in FIG. 9) may correspond to a timing at which the vehicle M starts control for the vehicle M entering the second road R2, and may correspond to a timing that is different from the starting timing.

Figure 9:
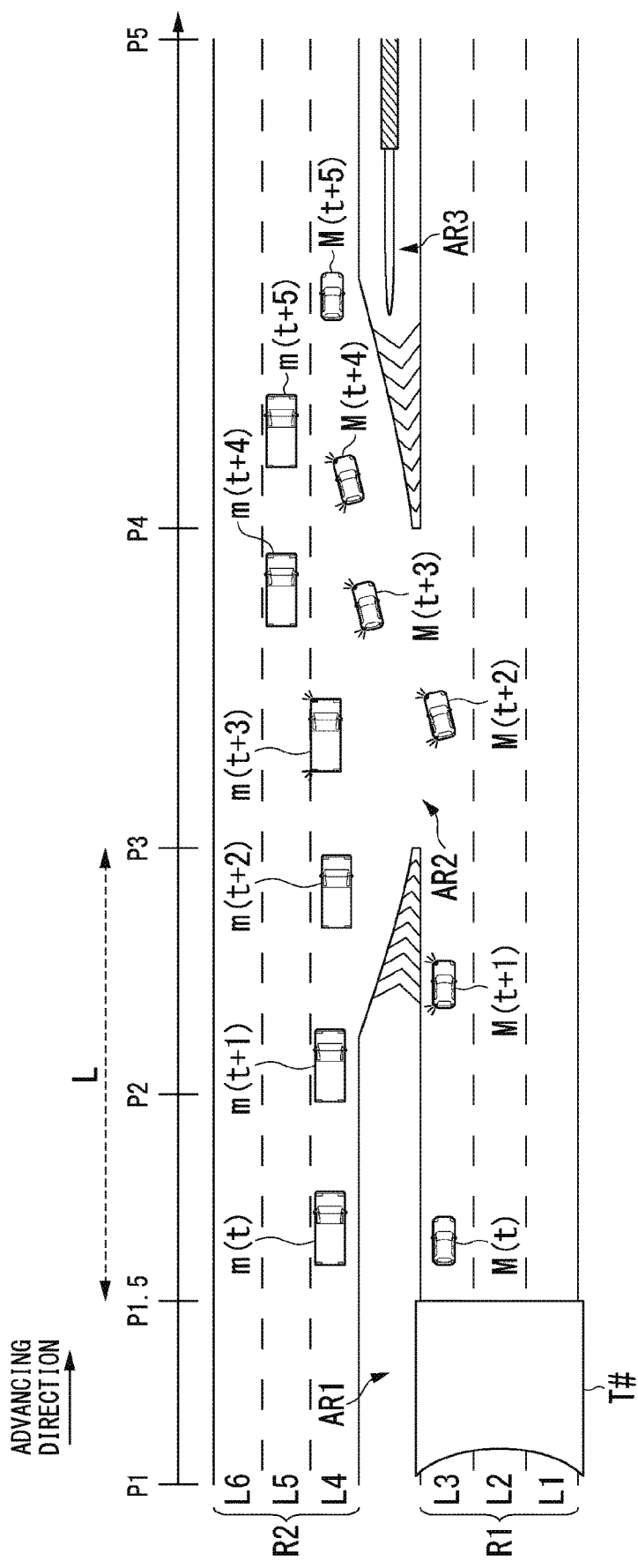
FIG. 9 is a diagram showing first control.

FIG. 9 is a diagram showing the first control. The description will focus on differences from FIG. 3 and the like. In FIG. 9, for example, a tunnel T # is provided between the position P1 and the position P1.5. The position P1.5 is a position between the position P1 and the position P2, and is a position, for example, at a first distance L from the position P3. For example, at time point t of reaching the position P1.5, in a case where another vehicle m that is a target vehicle on the second road R2 is recognizable across the division region AR1, the action controller 146 performs the first control. The action controller 146, for example, performs gentle acceleration, and thus the vehicle M is located in front of another vehicle m at time point t+1. At time point t+2, the vehicle M starts to move to the second road R2. At the time point t+3, the vehicle M enters the second road R2. At time point t+4, the vehicle M travels on the second road R2.

Figure 10:
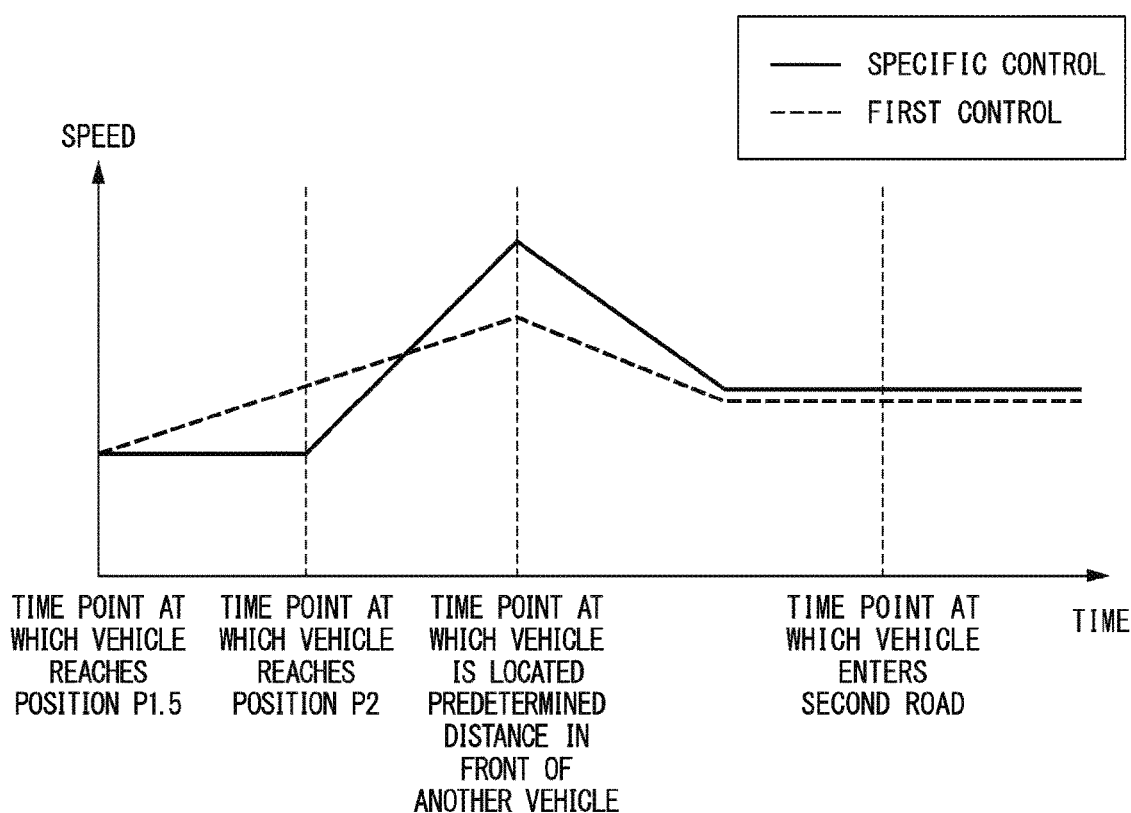
FIG. 10 is a diagram showing examples of a change in a speed in the specific control and a change in a speed in the first control.

FIG. 10 is a diagram showing examples of a change in a speed in the specific control and a change in a speed in the first control. A longitudinal axis in FIG. 10 expresses a speed, and a transverse axis in FIG. 10 expresses time. In the first control, acceleration is started at a time point where the vehicle M reaches the position P1.5, and deceleration is performed at a time point at which the vehicle M is located a predetermined distance in front of another vehicle m. Thereafter, the vehicle M travels at a predetermined speed and enters the second road R2.

In the specific control, acceleration is started at a time point where the vehicle M reaches the position P2, and deceleration is performed at a time point at which the vehicle M is located a predetermined distance in front of another vehicle m. Thereafter, the vehicle M travels at a predetermined speed and enters the second road R2. As shown in FIG. 10, an acceleration at which the vehicle M is located in front of another vehicle m in the specific control is higher than an acceleration at which the vehicle M is located in front of another vehicle m in the first control. As shown in FIG. 10, a deceleration after the vehicle M is located in front of another vehicle m in the specific control is higher than a deceleration after the vehicle M is located in front of another vehicle m in the first control.

As described above, the automated driving control device 100 performs control appropriate for an environment on the basis of the environment (in other words, a state in which a vehicle traveling on the second road R2 is recognized) of the first road R1 on which the vehicle M is traveling, and thus control more suitable for an occupant is realized. For example, in a case where a status of the second road R2 is recognizable at the position P1.5, the vehicle M suppresses an acceleration or a deceleration, and can thus enter in front of another vehicle m on the second road R2 with a sufficient margin. For example, even in a case where a status of the second road R2 is not recognizable at the position P1.5 and is recognizable at the position P2, the vehicle M increases an acceleration or a deceleration more than in the first control, and can thus enter in front of another vehicle m on the second road R2.

According to the above-described second embodiment, the automated driving control device 100 changes control to be executed on the basis of a position where a status of the second road R2 is recognizable, and can thus realize control more suitable for an occupant.

In the above-described example, the tunnel T or the tunnel T # hinders the visibility of the second road R2, but a factor hindering the visibility may be another factor. Another factor may be, for example, a structure provided in the division region.

Some processes among the processes in each of the flowcharts may be omitted, and a process order may be changed as appropriate.

The specific control is not limited to a case where the visibility is hindered, and may be executed in a case where the visibility is not hindered. For example, when a target vehicle is present in a case where the vehicle M has reached a predetermined position (for example, the position P2), it is determined whether or not the specific control is to be executed, and, in a case where it is determined that the specific control is to be executed, the vehicle M performs the control of the above (1) to (3) and enters in front of the target vehicle as described in the embodiments. Consequently, the vehicle M can smoothly enter the second road R2.

The specific control may be executed in a case where a mode for executing the specific control is set by an occupant, and may not be executed in a case where the mode is not set. In a case where the specific control is not executed, for example, the vehicle M does not execute the specific control, and enters behind another vehicle m that is a target vehicle.

Figure 11:
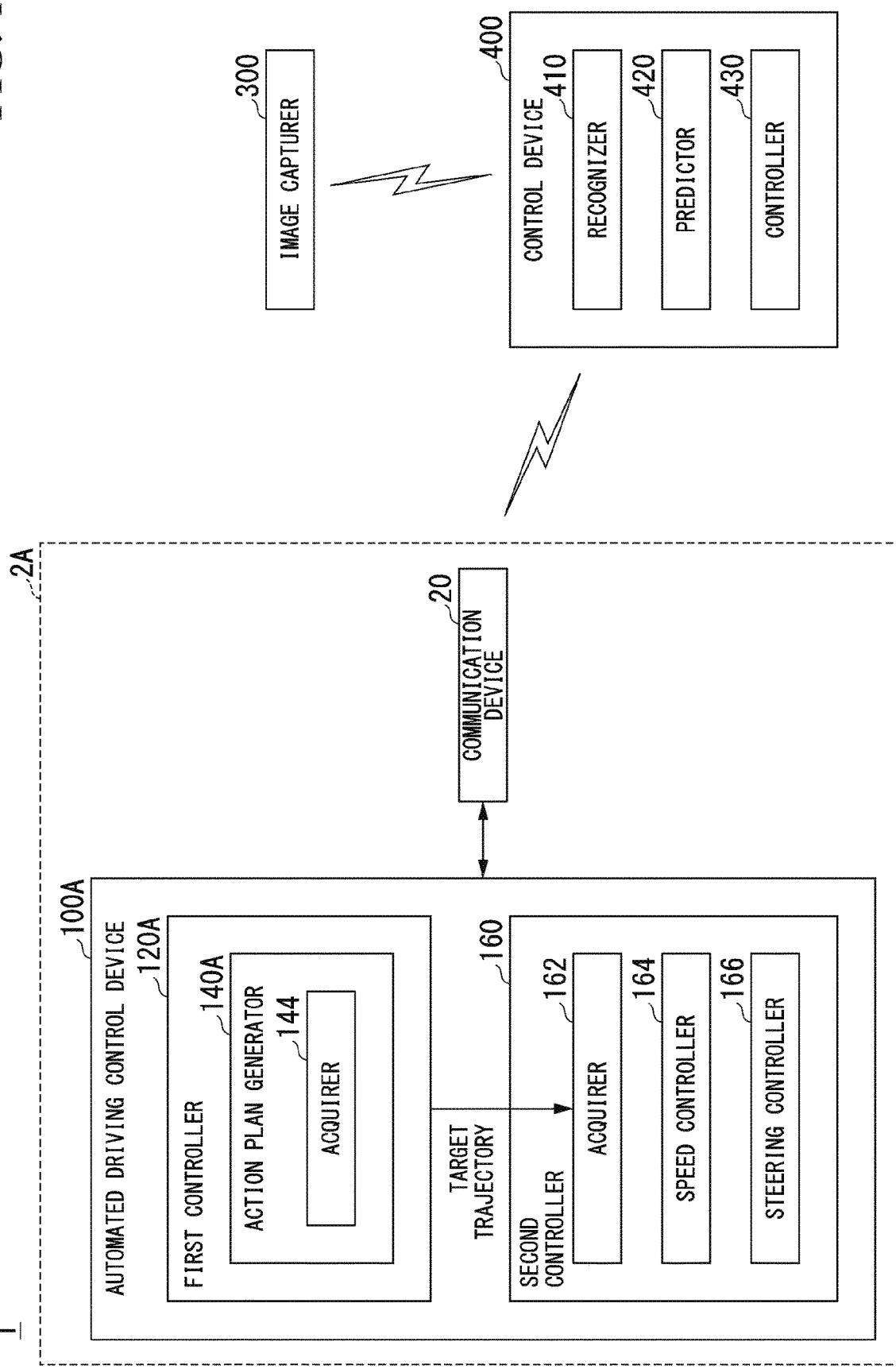
FIG. 11 is a diagram showing an example of a functional configuration of a vehicle control system 1.

The vehicle M may be remotely operated by using, for example, a functional configuration shown in FIG. 11. FIG. 11 is a diagram showing an example of a functional configuration of a vehicle control system 1. The vehicle control system 1 includes, for example, a vehicle system 2A, an image capture 300, and a control device 400. The vehicle system 2A performs communication with the control device 400, and the image capture 300 performs communication with the control device 400. The vehicle system 2A and the control device 400 perform communication with each other so as to transmit or receive information required for the vehicle M to automatedly travel on the first road R1 or the second road R2.

The image capture 300 is a camera that images the vicinity of a merging location where the first road R1 and the second road R2 shown in FIG. 3 and the like merge with each other. The image capture 300 images the vicinity of the merging location, for example, from a bird's-eye view direction. In the example shown in FIG. 11, the single image capture 300 is shown, but the vehicle control system 1 may include a plurality of image captures 300.

The vehicle system 2A includes an automated driving control device 100A instead of the automated driving control device 100. In FIG. 11, functional constituents other than the automated driving control device 100A and the communication device 20 are not shown. The automated driving control device 100A includes a first controller 120A and a second controller 160. The first controller 120A includes an action plan generator 140A. The action plan generator 140A includes, for example, an acquirer 144.

The control device 400 includes, for example, a recognizer 410, a predictor 420, and a controller 430. The recognizer 410 recognizes a vehicle or a lane in the vicinity of the first road R1 and the second road R2, an object required for the vehicle M to travel, display, and the like according to pattern matching, deep learning, and other image processing methods on the basis of an image captured by the image capture 300. for example, the recognizer 410 has a function equivalent to that of the recognizer 130. The predictor 420 has a function equivalent to that of the predictor 142.

The controller 430 has a function equivalent to that of the action plan generator 140 of the first embodiment. However, in the controller 430, the functions of the predictor 142 and the action controller 146 of the first embodiment are omitted. The controller 430 generates a target trajectory on which the own vehicle M will automatedly travel in the future such that the own vehicle can travel in a recommended lane (a recommended lane corresponding to information transmitted to the vehicle M) determined by the recommended lane determinator 61 in principle and can cope with a peripheral situation of the own vehicle M. As described in the above-described respective embodiments, when a target trajectory is generated, the controller 430 performs the specific control, and generates the target trajectory on the basis of a control result. The automated driving control device 100A causes the vehicle M to travel on the basis of the target trajectory transmitted from the control device 400.

Figure 12:
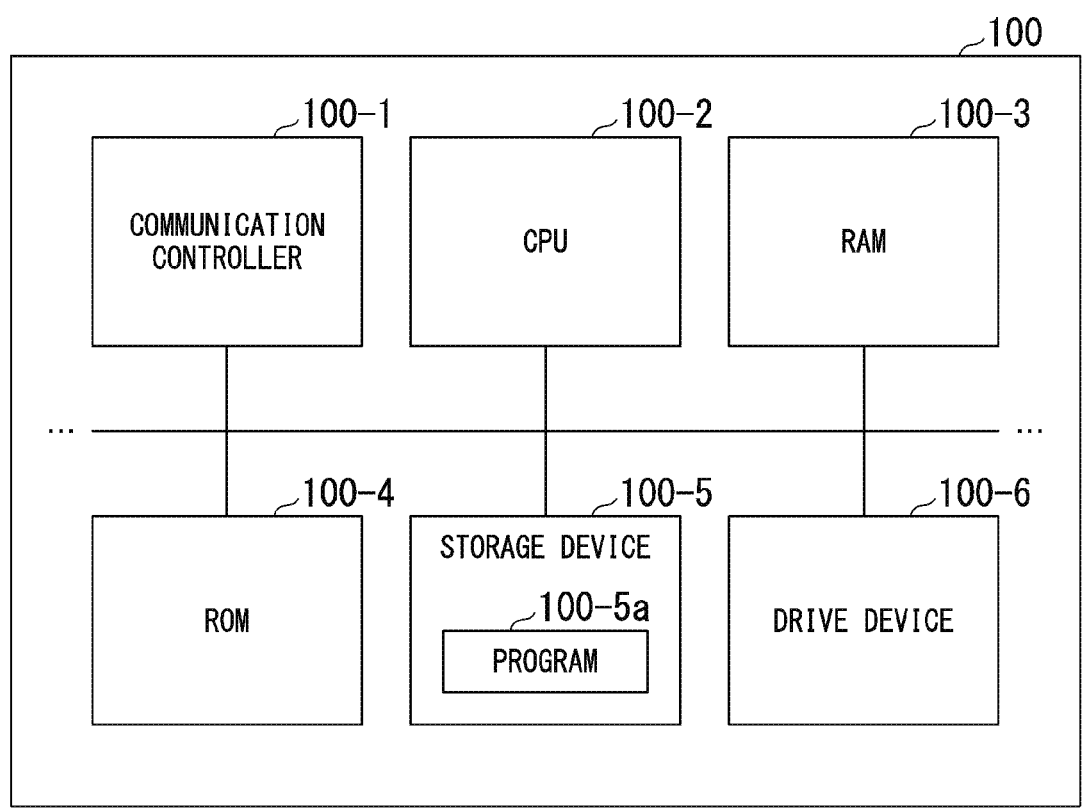
FIG. 12 is a diagram showing an example of a hardware configuration of the automated driving control device of the embodiment.

Hardware Configuration FIG. 12 is a diagram showing an example of a hardware configuration of the automated driving control device 100 of the embodiment. As shown in FIG. 12, the automated driving control device 100 is configured to include a communication controller 100-1, a CPU 100-2, a random access memory (RAM) 100-3 used as a working memory, a read only memory (ROM) 100-4 storing a boot program or the like, a storage device 100-5 such as a flash memory or a hard disk drive (HDD), and a drive device 100-6 that are connected to each other via an internal bus or a dedicated communication line. The communication controller 100-1 performs communication with constituents other than the automated driving control device 100. The storage device 100-5 stores a program 100-5a executed by the CPU 100-2. The program is loaded to the RAM 100-3 by a direct memory access (DMA) controller (not shown), and is executed by the CPU 100-2. Consequently, either or both of the recognizer 130 and the action plan generator 140 are realized.

The embodiments may be expressed as follows.

A vehicle control device includes a storage device storing a program, and a hardware processor, in which the hardware processor executes the program stored in the storage device, and thus acquires a recognition result that is recognized by a recognizer recognizing a periphery of a vehicle, controls an action of the vehicle on the basis of the acquired recognition result, and in a case where there is another vehicle traveling on a second road adjacent to a first road on which the vehicle is traveling, and the vehicle is controlled to overtake another vehicle, accelerates the vehicle, causes the vehicle to show an intention to enter the second road when the vehicle is located a predetermined distance or more in front of another vehicle in an advancing direction of the vehicle, and decelerates the vehicle while maintaining the vehicle in a state in which the vehicle is located in front of another vehicle at a timing based on the entry intention.

As mentioned above, the mode for carrying out the present invention has been described by using the embodiment, but the present invention is not limited to the embodiment, and various modifications and replacements may occur within the scope without departing from the spirit of the present invention.

What is claimed is:

1. A vehicle control device comprising:
an acquirer that is configured to acquire a recognition result that is recognized by a recognizer recognizing a periphery of a vehicle; and
an action controller that is configured to control an action of the vehicle on the basis of the recognition result acquired by the acquirer,
wherein, in a case where there is another vehicle traveling on a second road adjacent to a first road on which the vehicle is traveling, and the vehicle is controlled to overtake another vehicle, the action controller is configured to
accelerate the vehicle,
cause the vehicle to show an intention to enter the second road when the vehicle is located a predetermined distance or more in front of another vehicle in an advancing direction of the vehicle after the vehicle is accelerated, and
decelerate the vehicle while maintaining the vehicle in a state in which the vehicle is located in front of another vehicle at a timing based on the entry intention.

2. The vehicle control device according to claim 1, wherein the action controller is configured to cause the vehicle to show the entry intention by flashing a direction indicator of the vehicle.

3. The vehicle control device according to claim 1, wherein the action controller is configured to decelerate the vehicle while maintaining the vehicle in a state in which the vehicle is located in front of another vehicle at a timing at which the entry intention is shown or within a predetermined time from the timing at which the entry intention is shown.

4. The vehicle control device according to claim 1, wherein the action controller is configured to control the vehicle to overtake another vehicle in a case where predetermined conditions related to another vehicle, the vehicle, and a reference position when the vehicle enters the second road are satisfied.

5. The vehicle control device according to claim 4, wherein the predetermined conditions include at least one of
a relative speed of another vehicle to the vehicle being equal to or lower than a predetermined speed,
another vehicle being present within a predetermined distance from the vehicle in the advancing direction of the vehicle, and
the vehicle being located in front of another vehicle in the advancing direction of the vehicle before reaching the reference position in a case where the vehicle is accelerated at a predetermined acceleration.

6. The vehicle control device according to claim 1, wherein, in a case where a plurality of other vehicles are traveling at predetermined intervals on the second road, the action controller is configured to control the vehicle to overtake the plurality of other vehicles.

7. The vehicle control device according to claim 1, wherein, in a case where the vehicle reaches a location a specific distance before a region where the vehicle can enter the second road from the first road, another vehicle is recognized after control for the vehicle entering the second road is started, and the vehicle is controlled to overtake another vehicle, the action controller is configured to
execute specific control of accelerating the vehicle, causing the vehicle to show the intention to enter the second road after the vehicle is accelerated, and decelerating the vehicle while maintaining the vehicle in a state in which the vehicle is located in front of another vehicle at the timing based on the entry intention, and
not execute the specific control in a case where the vehicle reaches the location a specific distance before the region, another vehicle is recognized when or before the control for the vehicle entering the second road is started, and the vehicle is controlled to overtake another vehicle.

8. The vehicle control device according to claim 1, wherein the action controller is configured to accelerate the vehicle at a first acceleration in a case where a status of the second road is recognizable at a location a first distance before a region where the vehicle can enter the second road from the first road, another vehicle is recognized, and the vehicle is controlled to overtake another vehicle, and
wherein the action controller is configured to accelerate the vehicle at a second acceleration higher than the first acceleration in a case where the status of the second road is recognizable at a location a distance shorter than the first distance, another vehicle is recognized, and the vehicle is controlled to overtake another vehicle.

9. The vehicle control device according to claim 8, wherein, in a case where the vehicle is accelerated at the first acceleration, the action controller is configured to
cause the vehicle to show the intention to enter the second road, and
decelerate the vehicle at a first deceleration while maintaining the vehicle in a state in which the vehicle is located in front of another vehicle at the timing based on the entry intention, and
wherein, in a case where the vehicle is accelerated at the second acceleration higher than the first acceleration, the action controller
cause the vehicle to show the intention to enter the second road, and
decelerate the vehicle at a second deceleration higher than the first deceleration while maintaining the vehicle in a state in which the vehicle is located in front of another vehicle at the timing according to the entry intention.

10. A vehicle control method of causing a computer to:
acquire a recognition result that is recognized by a recognizer recognizing a periphery of a vehicle;
control an action of the vehicle on the basis of the acquired recognition result; and
in a case where there is another vehicle traveling on a second road adjacent to a first road on which the vehicle is traveling, and the vehicle is controlled to overtake another vehicle,
    accelerate the vehicle,
    cause the vehicle to show an intention to enter the second road when the vehicle is located a predetermined distance or more in front of another vehicle in an advancing direction of the vehicle after the vehicle is accelerated, and
    decelerate the vehicle while maintaining the vehicle in a state in which the vehicle is located in front of another vehicle at a timing according to the entry intention.

11. A non-transitory computer readable storage medium storing a program causing a computer to:
acquire a recognition result that is recognized by a recognizer recognizing a periphery of a vehicle;
control an action of the vehicle on the basis of the acquired recognition result; and
in a case where there is another vehicle traveling on a second road adjacent to a first road on which the vehicle is traveling, and the vehicle is controlled to overtake another vehicle,
    accelerate the vehicle,
    cause the vehicle to show an intention to enter the second road when the vehicle is located a predetermined distance or more in front of another vehicle in an advancing direction of the vehicle after the vehicle is accelerated, and
    decelerate the vehicle while maintaining the vehicle in a state in which the vehicle is located in front of another vehicle at a timing according to the entry intention.

\* \* \* \* \*